Jan. 20, 1948. C. J. BURCH Re. 22,964
METHOD OF AND APPARATUS FOR WORKING MINERAL MATERIALS AND THE LIKE
Original Filed Dec. 3, 1940 4 Sheets-Sheet 1
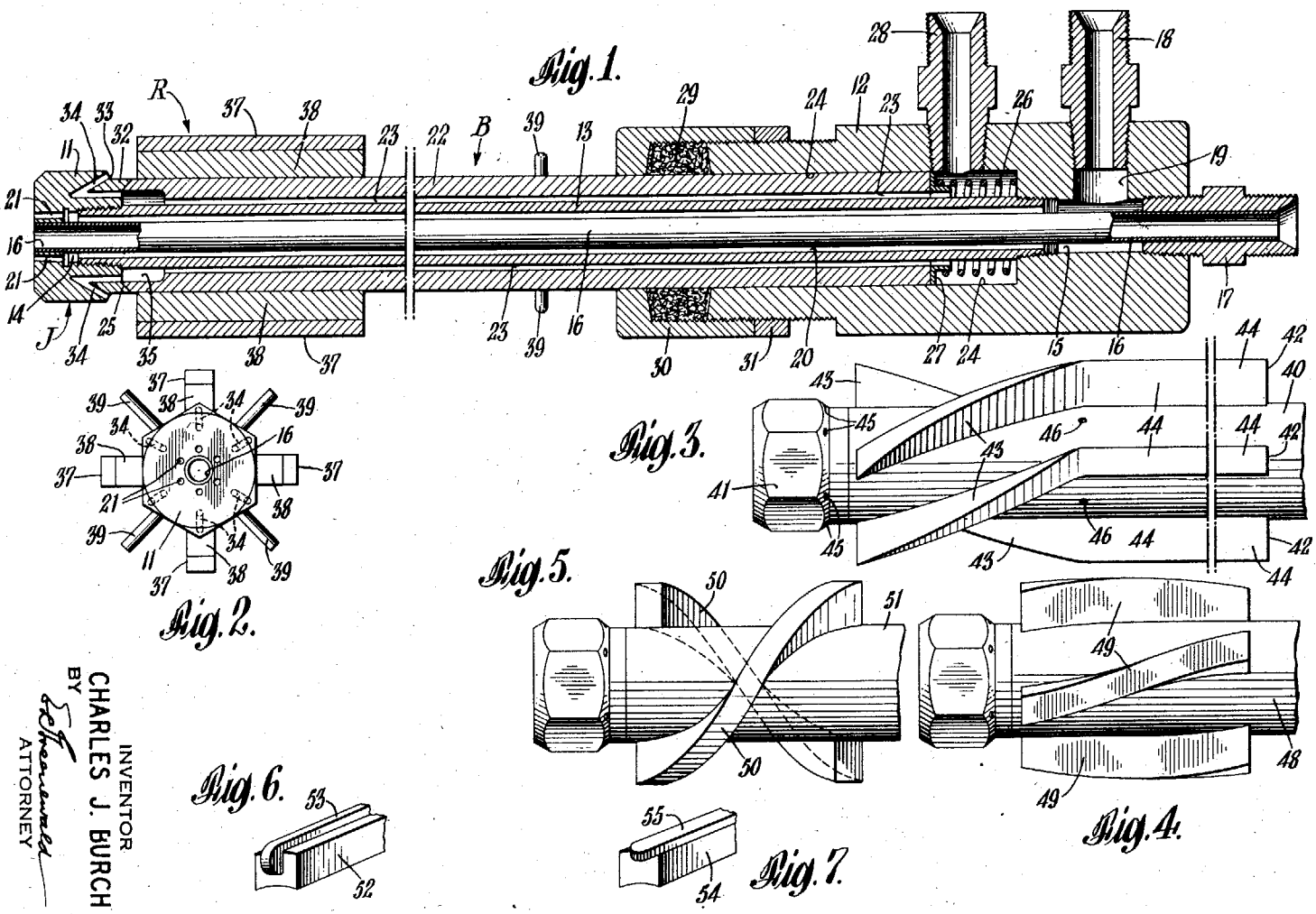
INVENTOR
CHARLES J. BURCH
BY
E. A. Greenewald
ATTORNEY

METHOD OF AND APPARATUS FOR WORKING MINERAL MATERIALS AND THE LIKE

Original Filed Dec. 3, 1940 4 Sheets-Sheet 2

INVENTOR
CHARLES J. BURCH
BY
ATTORNEY

Jan. 20, 1948. C. J. BURCH Re. 22,964

METHOD OF AND APPARATUS FOR WORKING MINERAL MATERIALS AND THE LIKE

Original Filed Dec. 3, 1940 4 Sheets-Sheet 3

INVENTOR
CHARLES J. BURCH
BY E. Greenewald
ATTORNEY

Jan. 20, 1948. C. J. BURCH Re. 22,964
METHOD OF AND APPARATUS FOR WORKING MINERAL MATERIALS AND THE LIKE
Original Filed Dec. 3, 1940 4 Sheets-Sheet 4
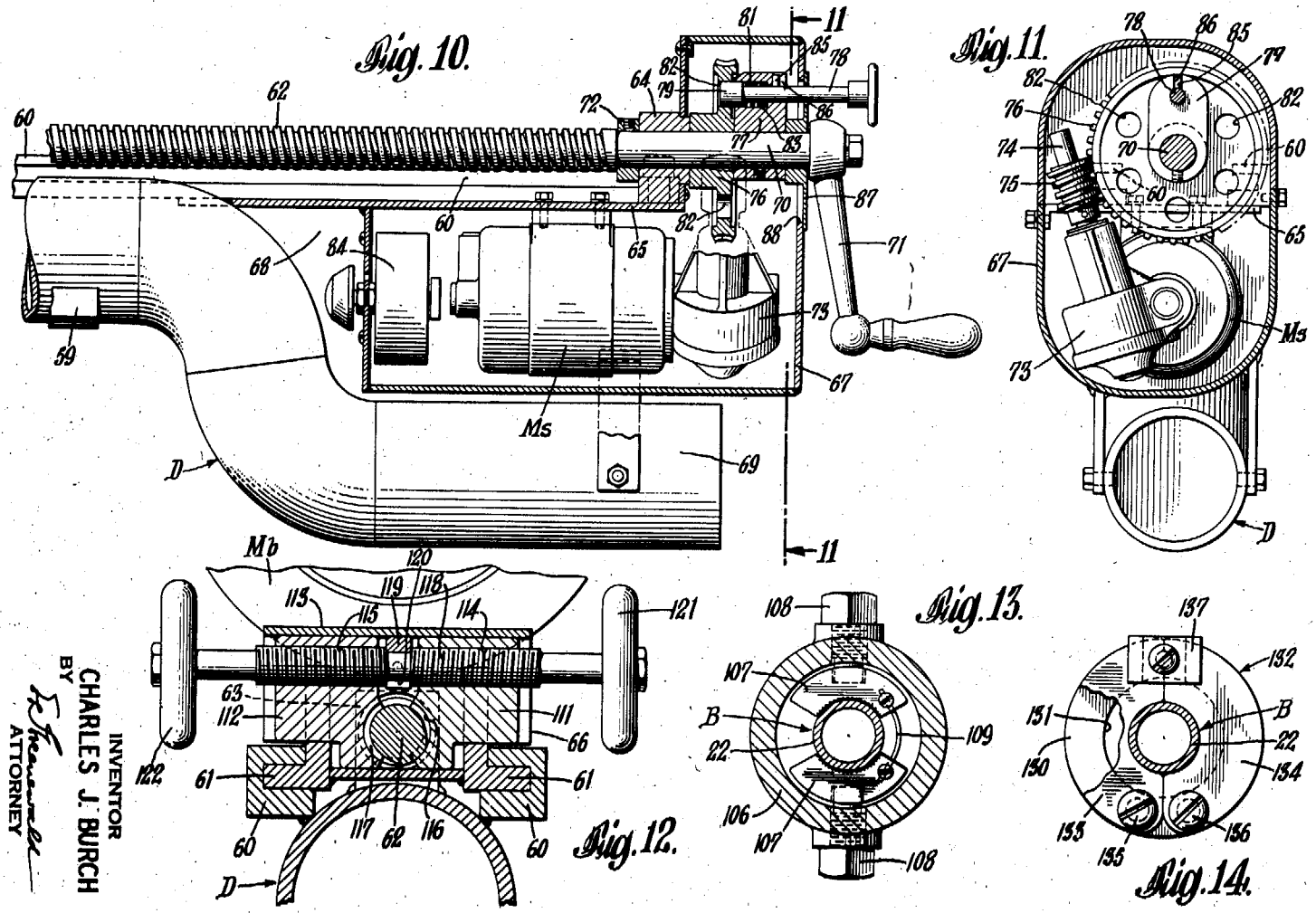
INVENTOR
CHARLES J. BURCH
BY
F. Freenewald
ATTORNEY Reissued Jan. 20, 1948

Re. 22,964

UNITED STATES PATENT OFFICE 22,964

METHOD OF AND APPARATUS FOR WORKING MINERAL MATERIALS AND THE LIKE

Charles J. Burch, Pittsburgh, Pa., assignor to The Linde Air Products Company, a corporation of Ohio Original No. 2,327,496, dated August 24, 1943, Serial No. 368,288, December 3, 1940. Application for reissue September 4, 1947, Serial No. 772,043

24 Claims. (Cl. 255—1.8)

The invention relates to a method of and apparatus for thermally working mineral materials and the like, such as by piercing, cutting, or grooving. More particularly, the invention relates to such a method and apparatus whereby deep holes for blasting and the like may be pierced in mineral materials which have the property of melting under the action of intense localized heat. Some examples of mineral materials and the like which have been worked successively by means of the method and apparatus of the present invention are iron ore, Portland cement concrete, conglomerate copper ore, gabbro trap rock, granite, and refractories such as common brick.

Piercing or otherwise working mineral materials and the like, as carried out in quarrying, mining, and similar operations, usually is accomplished by mechanical means, such as pneumatic drills, saws, or chisels, often aided by explosives such as dynamite. Such mechanical operations are slow and, in the case of pneumatic drilling of blasting holes in particular, require an investment in a large number of drill bits which much be resharpened frequently. Moreover, the greater the hardness and abrasiveness of the material to be worked, the greater is the cost and the slower is the rate of mechanical working.

Although the thermal working of mineral materials and the like which melt under the action of intense localized heat has been known heretofore—for example, as disclosed in Patent 2,327,482 of R. B. Aitchison, C. W. Swartout, and V. C. Williams, granted August 24, 1943—such operations have not been wholly successful commercially for piercing blast holes of sufficient depth and smoothness to meet the requirements of mines and quarries. The failure of previously known methods to produce completely successful hole piercing may be attributed primarily to the difficulty of continuously removing the melted material or slag from the hole as the depth of the hole being pierced increased. Attempts to remove the slag in the fluid condition from the hole, as by a blast of air, have been unsuccessful after the depth of the hole has increased beyond about two feet because the fluid slag tends to solidify upon the walls of the hole as the distance from the source of heat increases. The addition of suitable fluxes to the melted material to produce spontaneous disintegration of the solidified slag, with subsequent removal by jets of air or water, also has been attempted but has been found insufficiently effective to make thermal hole piercing commercially successful. Another disadvantage of prior methods of thermally working mineral materials is their lack of adaptability to automatic operation. This results from the widely variable rate of advance caused by difficulties in slag removal.

The principal object of the present invention is to provide a method of and apparatus for thermally working, as by piercing, cutting, or grooving, mineral materials and the like, which shall overcome the disadvantages of known mechanical and thermal methods discussed above.

Other objects are the provision of a novel method for thermally piercing deep, smooth-walled holes in meltable mineral materials and the like; the provision of such a method which shall be particularly adaptable to automatic and continuous operation; the provision of such a method which shall be operable with a speed and economy which are substantially independent of the hardness of the mineral material; and the provision of such a method in which the melted material will be continuously solidified and disintegrated in the hole, thereafter being removed in the disintegrated solid state.

Still another object of the invention is the provision of novel heating and slag disintegrating instrumentalities for performing the method of the invention. Other objects are the provision of blowpipe apparatus which shall include slag-disintegrating means; which shall be sturdy, simple, and inexpensive in construction; and which shall be particularly adaptable to automatic operation. Another object is to provide various forms of slag-disintegrating means.

Still another object of the invention is the provision of suitable apparatus for continuously and automatically performing the method of the invention. Other objects are the provision of such apparatus whereby a heating instrumentality and slag disintegrating means may be advanced along a selected path while the slag disintegrating means is continuously actuated; whereby the heating instrumentality and slag disintegrating means may be advanced selectively either automatically or manually; and whereby a heating instrumentality of relatively great length may be advanced for substantially its full length by relatively much shorter apparatus. Another object is the provision of such apparatus, including a combination debris-collecting housing and supporting bearing for a heating instrumentality.

The above and other objects, and the novel features of the invention, will become apparent from the following description, having reference to the annexed drawings, wherein:

Fig. 1 is a longitudinal sectional view of a blowpipe, including slag-disintegrating means, for carrying out the method of the invention;

Fig. 2 is an end elevational view of the blowpipe of Fig. 1 as viewed from the left;

Fig. 3 is a side elevational view of the front portion of a blowpipe like that shown in Fig. 1 but having a modified form of slag disintegrating teeth;

Fig. 4 is a side elevational view of the front portion of a blowpipe like that shown in Fig. 1, but having another modified form of slag-disintegrating teeth;

Fig. 5 is a side elevational view of the front portion of a blowpipe like that shown in Fig. 1, but having still another modified form of slag-disintegrating teeth;

Figs. 6 and 7 are perspective views of two forms of slag-disintegrating teeth;

Figs. 9 and 10 are detailed longitudinal sectional views, parts being in elevation, of the front and rear portions, respectively, of automatic mineral working apparatus according to the invention;

Fig. 11 is a sectional view taken along the line 11—11 of Fig. 10;

Fig. 12 is a sectional view taken along the line 12—12 of Fig. 9;

Fig. 13 is a sectional view taken along the line 13—13 of Fig. 9;

Fig. 14 is a sectional view taken along the line 14—14 of Fig. 9; and

Figures 8, 15:
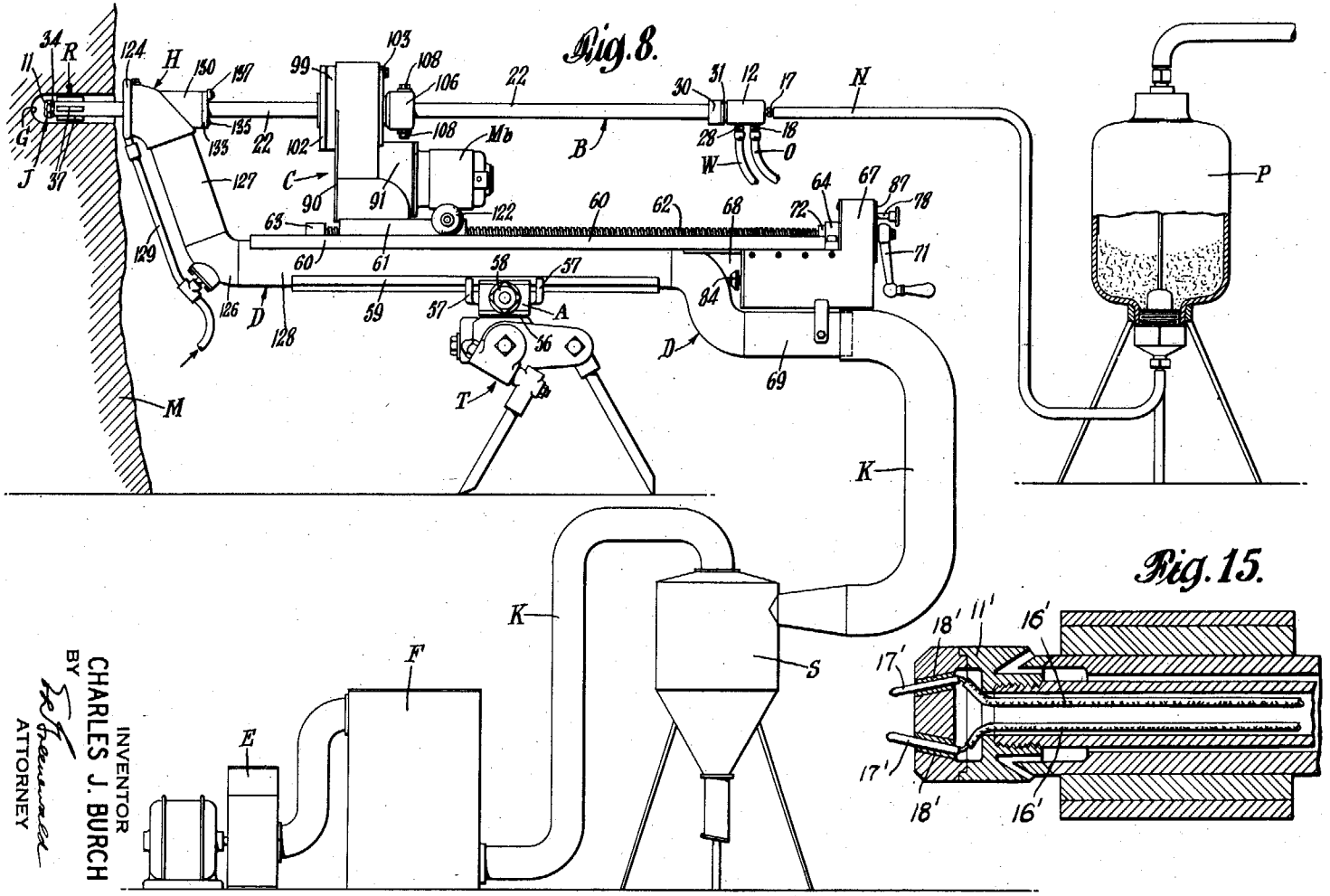
Fig. 8 is a side elevational view, partly broken away and in section, showing apparatus set up for automatically piercing a hole in a mass of mineral material by the method of the invention.
Fig. 15 is a longitudinal sectional view of a modified form of apparatus embodying the invention.

Briefly, the method of working mineral materials and the like according to the present invention, as by piercing, cutting or grooving, comprises progressively and continuously applying heat to a mineral mass and melting material along a selected path to form a fluid slag, removing the fluid slag from the zone of application of the heat, quenching and solidifying the fluid slag, mechanically disintegrating the quenched slag, and promptly and continuously removing the disintegrated slag from the region of disintegration.

Although some mineral materials form an easily friable slag without requiring the addition of a flux, it usually is desirable to add to the molten mineral material a flux having a composition so correlated with the composition of the material that the resulting slag will have a low melting point and will be highly fluid for removal from the zone of application of heat, yet, when quenched and solidified, may be disintegrated easily. A preformed flux may be used if desired, but it has been found most advantageous to introduce an exothermically oxidizable flux-forming powdered material (for example, aluminum, ferro-manganese, zirconium-silicon or mixtures of such materials) continuously into the zone of heating, where it is oxidized by oxygen gas and enters the molten slag. This latter manner of introducing flux has the advantage of releasing to the melting zone the extremely high temperature heat of oxidation of the exothermically oxidizable flux-forming material.

The method of the invention will be described more specifically in connection with Figs. 1 and 2, by way of example, as applied to the formation of horizontal blast holes in mineral materials and the like by a heating instrumentality, such as the blowpipe B. Other types of heating instrumentalities, of course, may well be used—for example, electric arc instrumentalities. One form of blowpipe B according to the invention, as shown in Fig. 1, comprises an elongated straight tubular member including a heat-producing unit, J, and rotatable slag-disintegrating means R arranged outside of and concentric with the heat-producing unit J. The heat producing unit J of the blowpipe, shown by way of example only, comprises a hexagonal tip 11 rigidly connected to a rear body or header 12 by means of an oxygen gas conduit 13, which is threaded at its forward end within a bore 14 in the tip and at its rear end is threaded within the front of a bore 15 in the rear body. A centrally arranged acetylene conduit 16, which fits snugly at its forward end within a central passage in the tip 11 and opens to the front face of the tip, at its rear end is secured to an inlet nipple 17 threaded into the rear end of the bore 15 in the rear body 12. Acetylene gas, or a suspension of flux or flux-forming powder in acetylene, thus may be conducted through the conduit 16 and discharged in a central stream from the blowpipe tip 11.

Oxygen gas is admitted to the bore 15 through an inlet nipple 18, threaded into a cross bore 19 in the body 12, and passes forward through the annular space 20 between the central acetylene conduit 16 and the oxygen conduit 13 to the blowpipe tip 11, where it enters the front of the bore 14. Thence, the oxygen is discharged from the front of the tip 11 through a plurality of discharge ducts 21 arranged in an annular ring around the end of the central conduit 16, and inclined forwardly towards the longitudinal axis of the blowpipe and toward one another. Thus, oxygen gas is discharged from the tip 11 in a plurality of small streams which intersect the central acetylene stream externally of the blowpipe and produce a combustible gas mixture which, when ignited, forms a so-called "diffusion-type" flame which is not susceptible to flashbacks when used in confined spaces, as in rock piercing operations. Simultaneously, any exothermically oxidizable flux-forming powder carried by the acetylene is oxidized by the oxygen stream and adds its heat to that produced by the gas mixture. The terms "oxygen" and "acetylene" are used for simplicity as representative of any suitable oxidizing gas and any suitable fuel-gas respectively.

The slag-disintegrating means R comprises an annular reamer tube or sleeve 22 which is sleeved over and surrounds the conduits 13 and 16 of the flame-producing unit J in spaced relation to the conduit 13 to provide an annular cooling fluid passage 23. The sleeve 22 is journalled at its rear for rotation within a counterbore 24 in the front of the rear body 12; and at the front the sleeve 22 is supported by the tip 11 in fluid-tight relation thereto by a cone seat 25 at the rear of the tip cooperating with the bevelled front end of the sleeve 22. A coil spring 26 in the counterbore 24 is compressed between the bottom surface of the counterbore and an annular flanged thrust washer 27, which in turn bears against the rear end of the sleeve 22, thus resiliently urging the forward end of the sleeve 22 against the seat 25 with a light pressure and maintaining a tight joint while the sleeve 22 rotates. A fluid, such as water, for cooling the blowpipe, and for quenching and ejecting slag, is supplied to the annular passage 23 through an inlet nipple 28 which opens into the counterbore 24 in back of the rear end of the sleeve 22. Leakage of water from the front of the counterbore 24 is prevented by means of suitable packing material 29, which is compressed against both the front face of the rear body 12 and the external surface of the sleeve 22 by means of an internally threaded gland nut 30 threaded over the front of the body 12 and held in fixed position by means of a lock nut 31.

For a short portion of its length adjacent to its rear end the hexagonal tip 11 is cylindrical in shape, as at 32, thus forming a bevelled shoulder 33 at each corner of the tip.

A plurality of generally V-shaped liquid discharge passages or ports 34 are arranged in a ring in the tip 11, one leg of each port being inclined at an angle outwardly toward the rear end of the blowpipe and having an external discharge orifice on the bevelled shoulder 33 of the tip. The other leg of each liquid discharge port 34 extends substantially parallel to the blowpipe axis and communicates with an annular distributing chamber 35 formed between the conduit 13 and the wall of a counterbore in the front of the sleeve 22.

The sleeve 22 carries adjacent to its forward end, and as close as possible to the front of the tip 11, four equi-spaced radially outstanding slag-disintegrating reamer teeth 37, which may be welded or otherwise secured to the sleeve 22. In the particular example shown in Fig. 1, each of the teeth 37 comprises a relatively long and narrow straight steel base member 38 of rectangular cross section, arranged parallel to the longitudinal axis of the blowpipe, and carrying a fusion deposited layer of an intensely hard and wear-resistant facing material such as Haynes Stellite alloy (a cobalt-chromium-tungsten alloy) upon the surfaces subject to the greatest abrasion in service, such as the top surfaces of the teeth. The blowpipe is similar in some respects to the blowpipes described and claimed in Patent No. 2,286,191, issued June 16, 1942, to R. B. Aitchison, C. J. Burch, and C. W. Swartout.

When performing the method of the invention, as applied to hole piercing, with the blowpipe of Figs. 1 and 2, acetylene gas, or a suspension of powdered preformed flux or an exothermically oxidizable flux-forming substance in acetylene gas, is discharged in a central stream from the tip 11 through the front of the conduit 16 and is intimately mixed externally of the blowpipe with the converging oxygen gas jets issuing from the ducts 21. The combustible gas mixture thus formed is ignited and the blowpipe is held with the tip 11 close to the face of the mineral mass to be pierced until material starts to melt under the influence of the flame and a shallow crater forms as the loosened slag flows away under the influence of gravity and the gas pressure. As the depth of the crater increases, the blowpipe is advanced into the hole to heat continuously the material at the bottom, and the molten slag flows rearwardly. Meanwhile, the reamer sleeve 22 is continuously rotated relatively to the heat-producing unit J, either manually with the spokes 39 providing a hand hold, or automatically as will be described hereinafter. The sleeve 22 is rotated preferably in a direction which will cause the tip 11 to be tightened on the threads at the front of the conduit 13. Thus, for example, if the tip 11 must be tightened on the conduit 13 with a clockwise motion, as seen in Fig. 2, the reamer tube 22 should be rotated clockwise as viewed from the tip end in Fig. 2.

Cooling water which is passed through the space 23 surrounding the oxygen conduit 13 is discharged from the tip 11 in a rearward direction ahead of the teeth 37 through the ports 34, thus serving the triple purpose of cooling the blowpipe, quenching and solidifying the molten slag which flows continuously rearwardly from the melting zone ahead of the tip 11 under the influence of gas pressure, and assisting ejection of the slag from the hole after disintegration. As the sleeve 22 is rotated, the projecting teeth 37 mechanically disintegrate the quenched and solidified slag by physical impact therewith into small particles, which are then ejected from the hole by the force of a flowing stream of ejection fluid, including the gaseous products of combustion, the steam resulting from the slag-quenching operation, and the quenching water streams discharged from the ports 34. In addition, the teeth 37 ream the walls of the hole to make them smooth and provide a hole of uniform diameter.

The front portions only of three modified forms of blowpipes are shown in elevation in Figs. 3, 4, and 5, inasmuch as the tip and the rear body of each, and the manner of connection of the various conduits to the tip and the rear body, are the same as in the blowpipe of Figs. 1 and 2. As shown in Fig. 3, a rotatable sleeve 40 carries adjacent to its forward end, and just in back of the tip 41, a plurality of reamer teeth 42, preferably four spaced at quarter points around the periphery of the sleeve, which are of generally rectangular cross section and relatively great length as compared to the teeth of Fig. 1. Each tooth consists of a relatively short front portion 43 inclined forwardly along the surface of the sleeve 40 in the direction of rotation, preferably at a rake angle of about 15° with respect to the projection of the longitudinal blowpipe axis upon the surface of the sleeve; and a relatively much longer straight portion 44 extending rearwardly from its junction with the front portion 43 substantially parallel to the longitudinal blowpipe axis. Inclination of the front portion of the teeth 42 in the direction of rotation causes the teeth actually to bite into the slag and move the slag rearwardly; and the great overall length of the teeth provides for complete, efficient and rapid disintegration of the quenched slag. In the modification of Fig. 3, streams of quenching fluid, such as water, are discharged from the ports 45 in the tip, as in the blowpipe of Fig. 1. In addition, however, the sleeve 40 is provided with a plurality of auxiliary radial fluid discharge ports 46, one being located midway between each pair of teeth 42 approximately on a line with the junctions of the inclined portions 43 and the straight portions 44. Fluid, such as water, is discharged from the ports 46 and provides for a continuous quenching action on the slag over a much longer distance of travel than is possible with the blowpipe of Fig. 1, thereby producing more complete solidification of the slag before it passes beyond the zone of action of the teeth 42 Moreover, the fluid leaving the ports 46 has an advantageous cooling action on the reamer teeth 42, thus protecting them from possible destruction.

As shown in Fig. 4, the rotatable sleeve 48 carries adjacent to its forward end a plurality of reamer teeth 49, preferably four, which are inclined forwardly in the direction of rotation at a rake angle with respect to the projection of the longitudinal axis of the sleeve 48 upon the outer surface of the sleeve. As in the blowpipe of Fig. 3, inclination of the teeth forwardly in the direction of rotation causes them to bite into the slag and tends to move the slag rearwardly. Although teeth set at a rake angle up to 45° may be advantageous, the rake angle preferably should be less than 30°. As shown in Fig. 4, the teeth 49 are set at a rake angle of about 15°, which has been found most satisfactory for slag disintegration with the least interference with slag removal from a hole.

Fig. 5 shows a blowpipe with two generally helix-shaped teeth 50, each tooth extending at least half-way around the sleeve 51 and being inclined forwardly in the direction of rotation. Such teeth not only break up the solidified slag but assist in conveying the slag rearwardly towards the mouth of the hole being pierced. A single tooth extending at least once completely around the sleeve 51 also may be used.

As mentioned in connection with Fig. 1, the surfaces of greatest wear on reamer teeth may be protected by an extremely hard wear-resistant material carried by a relatively softer base metal. As also described in connection with Fig. 1, protection may be accomplished by melting and depositing a layer of Haynes Stellite alloy, or a similar material, which permits teeth to be rebuilt easily and quickly to gauge when worn. Figs. 6 and 7 show two other ways of protecting reamer teeth against excessive wear, which are particularly applicable to straight teeth. In Fig. 6, the top of a straight tooth 52 is slotted longitudinally from the top through about half its thickness and between its sides. A preformed insert 53 of tungsten carbide or a similar preformed wear-resisting material, then is inserted into the slot with its top edge projecting above the top surface of the tooth 52 and is brazed or otherwise secured firmly in place. Inserts of tungsten carbide or the like are used in a slightly different way in the tooth 54 of Fig. 7, wherein a shallow longitudinal groove is formed only in that upper corner of the tooth which includes the leading edge during rotation of the sleeve. An insert 55 of tungsten carbide or the like then is laid flat and is brazed or otherwise secured in place in the corner groove with one of its sides facing in the direction of rotation. In both Figs. 6 and 7, it is most desirable that the insert of tungsten carbide or the like have a rounded front edge which projects slightly beyond the forward end of the tooth base to reduce wear on the front of the tooth.

A few of the requirements for reamer teeth in general may well be considered. First, the height of the individual reamer teeth preferably should be between 25% and 50% of the outside diameter of the reamer sleeve to provide a reamed hole of a diameter between 50% and 100% greater than the diameter of the reamer sleeve. If the reamed hole has a diameter less than 150% of the reamer sleeve outside diameter, inadequate space for débris ejection usually is provided. Second, the length of the reamer teeth preferably should not be less than the diameter of the reamed hole to insure the production of a straight smooth-walled hole. The longer the teeth are, the more nearly straight the hole is and the greater the footage which can be drilled before the gauge is lost. For practical purposes, however, a length of tooth greater than about four times the diameter of the hole being reamed usually is not advantageous. Third, the reamer teeth should start as near the forward end of the blowpipe as is possible without interfering with the melting and slag quenching functions of the blowpipe. Fourth, the number of teeth is preferably four, although any number could be used. The greater the number of teeth, the more surely a round hole is produced, but the less the area available for ejection of débris from the hole.

As shown in Fig. 8, apparatus for working mineral materials and the like, as for piercing holes automatically according to the method of the invention, comprises a long straight heating instrumentality, such as the blowpipe B described in connection with Fig. 1 (but without the spokes 39), carried by a carriage C which moves longitudinally over a support comprising debris-removal conduit D having suitable ways or tracks on its upper surface for the carriage C to traverse, and having suitable ways on its bottom surface engaged by a sliding trunnion A which is pivotally mounted in a pivoted socket member of an adjustable tripod T. As described in connection with Fig. 1, the blowpipe B comprises a non-rotable heat-producing unit J which is supplied from suitable sources with combustion-supporting gas and fuel gas, such as oxygen and acetylene, respectively, through the hose connections O and N, respectively, and is adapted to produce an intense oxy-acetylene flame, preferably of the externally-mixed or "diffusion" type, at its forward end. The blowpipe B also comprises rotatable slag-disintegrating means R, including a sleeve 22 surrounding and spaced from the heat-producing unit J, and carrying adjacent to its forward end behind a tip 11 projecting reamer teeth 37. Cooling water for the blowpipe is supplied through the conduit W and flows in the annular space between the heat-producing unit J and the rotatable sleeve 22 to the forward end of the blowpipe, where it is discharged in a rearward direction. A powder dispenser P of any desired type, such as that described and claimed in Patent 2,327,337 issued to C. J. Burch, and W. C. Edwards on August 24, 1943, is interposed in the acetylene conduit N and permits suitable powdered flux or flux-forming material to be suspended in the acetlyene gas supplied to the blowpipe. If the character of the mineral material to be worked is such that no flux is required, the dispenser P may be left empty or removed.

In automatically performing the mineral working method of the invention, as applied to the piercing of a blast hole G in a mass M of rock or the like, the housing H of the debris-removal conduit D is positioned close to the rock face, the carriage C is adjusted to its rearmost position on its support, and the blowpipe B is adjusted on the carriage C to bring the tip 11 sufficiently close to the rock face that the intense externally mixed oxy-acetylene flame and the flux or flux-forming powder impinge against the rock. As in manual operation, material then melts and produces a shallow crater in the rock as the molten slag flows out under the influence of gravity and the gas pressure. As the depth of the hole increases, the carriage C is advanced steadily over its support by a feed screw, which may be either hand-driven or motor-driven, thus maintaining the tip 11 of the blowpipe B spaced properly with respect to the advancing bottom face of the hole. Concurrently, the rotatable sleeve 22 and reamer teeth 37 of the blowpipe are rotated continuously by a suitable motor drive mechanism carried by the carriage C. While the sleeve 22 is rotating, the heat-producing unit J, including the rear body 12 and the tip 11, is held against rotation by the weight of the conduits W, O, and N. Other means, of course, may be used to prevent rotation of the heat-producing unit J.

The flame produced at the forward end of the blowpipe B continues to melt off mineral material progressively from the bottom or forward face of the hole. The molten material then flows rearwardly from the zone of flame application in a highly fluid condition until it is brought into contact with the streams of cooling water discharged from the blowpipe and is quenched and solidified. As fast as it is produced, the solidified slag, which is quite friable, is continuously disintegrated by the rotating reamer teeth 37 carried by the sleeve 22 adjacent to its forward end. Disintegrated slag particles continuously are driven rearwardly toward the mouth of the hole G by the force of the gaseous products of combustion and the steam formed by the quenching operation, as well as by the propelling action of the rearwardly directed water streams themselves. After leaving the mouth of the hole G, the disintegrated slag particles, the gaseous products of combustion, the steam, and the discharged water are collected for the most part in the housing H and pass through the debris-removal conduit D, which is connected by a flexible hose K to a primary separator S, wherein most of the solid slag particles and water are separated from the entraining gases and discharged from the bottom of the separator. The gaseous products of combustion and the steam then pass through a bag filter F, of well-known construction, where any entrained solid particles are collected. The remaining gases then are discharged from the top of the exhaust fan E to the atmosphere.

From Fig. 8 it may be seen that the sliding trunnion A is so pivoted to the tripod T, and the legs of the tripod T are so pivoted and so adjustable as to length, that holes may be pierced at any desired angle to the face of a mineral mass M. Furthermore, the blowpipe driving apparatus may be underslung from the tripod T in inverted position whenever holes are to be pierced in a mineral mass close to the floor level.

Figure 9:
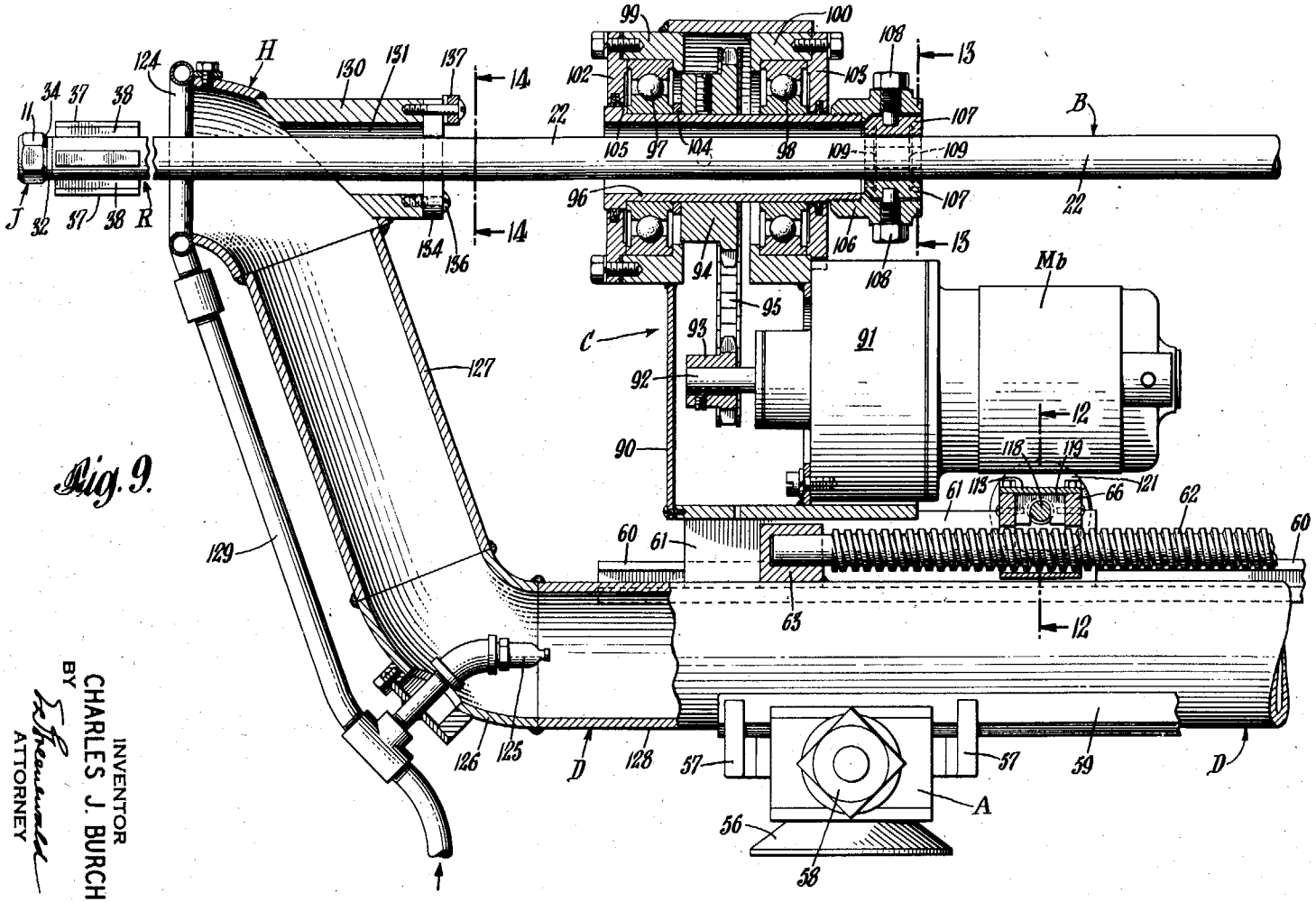

Figs. 9 to 14, inclusive, show in detail the construction of the novel apparatus for automatically performing the method of the invention, particularly for manipulating a heating and slag-breaking instrumentality, such as the blowpipe of the invention, for the piercing of holes in mineral materials and the like. The apparatus includes mechanism for advancing the rock piercing blowpipe B (shown in part) along a selected path to form a hole, and mechanism for continuously rotating the rotatable sleeve 22 of the blowpipe, carried upon a support of any suitable character. As shown in Fig. 9, the support includes a sliding trunnion A, of well-known construction, comprising a cone 56 adapted to be swiveled in the top of an adjustable tripod T (such as shown in Fig. 8), suitable clamping jaws 57, and an adjusting nut 58 whereby the jaws 57 may be engaged with or disengaged from longitudinally-extending ways 59 welded to the lower portion of a debris-removal conduit D to permit sliding adjustment of the conduit D in the trunnion A. Two long longitudinally-extending channel-shaped ways or tracks 60 are welded to opposite sides of the upper portion of the debris-removal conduit D with the open sides of the generally U-shaped channels facing one another.

The mechanism for advancing the blowpipe B over the support comprises a carriage C for the blowpipe, including two longitudinally-extending L-shaped slides 61 (see Fig. 12) which fit slidingly within the channels of the tracks 60. A feed screw 62, which is journaled at its forward end in a pillow block 63 welded to the top of the conduit D between the two tracks 60, and at its rear end is journalled in a pillow block 64 bolted to a bracket 65 secured to the tracks 60 adjacent to the rear end of the latter, drives the carriage C along the tracks 60 by engaging an adjustable split traveling nut 66 secured, as by welding, to the two slides 61.

The mechanism for selectively driving the feed screw 62 either manually or automatically is enclosed at the rear end of the apparatus in a housing 67, partially fitting within a clearance space 68 formed between the tracks 60 and a downwardly bent portion 69 of the debris-removal conduit D, and is secured by suitable brackets to both the debris-removal conduit D and to the portions of the two tracks 60 which overhang the bend 69. The rear portion of the feed screw 62 comprises a journal 70 which is journalled in the pillow block 64 and passes through the front and rear walls of the housing 67. A hand crank 71 is keyed on the rear end of the journal 70 to permit hand operation of the feed screw 62. Longitudinal movement of the feed screw 62 in the pillow blocks 63 and 64 is prevented by a collar 72 secured to the journal 70 just in front of the pillow block 64 by suitable set screws.

Automatic operation of the feed screw 62 may be obtained, if desired, by means of an electric motor Ms suspended from the bracket 65 by means of suitable bolts threaded into a projecting boss at the top of the motor housing. The motor Ms drives a suitable speed-reducing gear unit 73, including a shaft 74 carrying a worm 75 meshed with a worm gear 76, which is mounted for free rotation upon the journal 70 of the feed screw 62. An eccentric arm 77 is keyed to the journal 70 of the feed screw 62 in back of the worm gear 76 and carries adjacent to its outer end a longitudinally movable connecting pin 78 having an enlarged head 79 riding within a cavity 81 in the arm 77. The head 79 is adapted to be inserted within any one of the sockets 82 of the worm gear 76 and maintained in interlocking position by a coil spring 83 in the cavity 81. When the worm gear 76 and the eccentric arm 77 are interlocked by the connecting pin 78, the motor Ms will cause the feed screw 62 to rotate at a speed which may be regulated by a rheostat 84.

When manual operation of the feed screw 62 is desired, as when starting the piercing of a hole, the motor drive may be disengaged from the feed screw by drawing the spring-pressed connecting pin 78 rearwardly to carry the enlarged head 79 from the socket 82 of the worm gear 76 back into the cavity 81 of the eccentric arm 77. A stop pin 85, projecting laterally from the connecting pin 78, at the same time is carried rearwardly from a groove 86 in the rear side of the arm 77 to the rear face of the eccentric arm, whereupon the connecting pin then may be maintained in withdrawn position simply by turning it until the stop pin 85 abuts against the rear face of the eccentric arm 77. A circular shield 87 on the outside of the housing 67, through which the eccentrically arranged connecting pin 78 passes, is fixed to the journal 70 in back of the eccentric arm 77 and rotates with the drive screw 62 close to the outer rear wall of the housing to seal the large aperture 88 against the entrance of dirt which might foul the motor drive.

Details of the carriage C for the rock piercing blow-pipe B are shown in Figs. 9, 12, and 13. The housing 90 of welded sheet steel, which carries downwardly-extending L-shaped slides 61 and a traveling nut 66, as described previously, also includes a blowpipe-driving electric motor Mb and a speed reduction unit 91 having a horizontal shaft 92 carrying a sprocket 93, which is connected to another larger sprocket 94 adjacent to the top of the carriage C by a sprocket chain 95. The large sprocket 94 is mounted upon a short hollow shaft 96 by means of set screws, and the hollow shaft 96 in turn is mounted for rotation in ball bearings 97 and 98 disposed in bearing cups 99 and 100 arranged back-to-back and connected to the front and rear walls of the housing 90, respectively, as by welding. The bearings 97 and 98 are retained in the bearing cups 99 and 100 by suitable retaining plates 102 and 103, respectively, bolted to the rims of the cups. A steel spacing ring 104 is carried by the shaft 96 between the hub of the sprocket 94 and the inner race of the bearing 97 to maintain the parts in spaced relation to one another. At its forward end, the hollow shaft 96 is provided with a flange 105 which fits within a bore of the retaining plate 102 and bears against the inner race of the bearing 97; and at its opposite rear end the hollow shaft 96, which projects rearwardly through a bore in the retaining plate 103, is externally threaded for engagement with a chuck 106 having serrated movable jaws 107 gripping the rotatable reamer sleeve 22 of the blowpipe B (shown in part), which extends through the hollow shaft 96 in spaced relation to its inner wall.

Operation of the motor Mb causes the hollow shaft 96 and the chuck 106 to revolve, thus rotating the reamer sleeve 22 independently of the heat-producing unit J of the blowpipe. Rotation of the reamer sleeve 22, of course, revolves the outstanding reamer teeth 37 carried adjacent to the forward end of the blowpipe, with resulting disintegration of any solidified friable slag brought into contact with the teeth.

The blowpipe B may be adjusted longitudinally with respect to the carriage C simply by unscrewing the bolts 108 of the chuck 106 to withdraw the jaws 107 from engagement with the reamer sleeve 22. Separation of the two jaws 107 from the sleeve 22 is assisted by the two resilient hairpin springs 109 connecting the jaws 107 together. When it is desired to insert or remove the forward end of the blowpipe through the chuck 106, the bolts 108 are fully withdrawn from the jaws 107 and the latter removed from the chuck to provide a passage of sufficient size to accommodate the reamer teeth 37.

The position of the whole carriage C also may be quickly adjusted in the tracks 60 with respect to the feed screw 62 by disengaging from the feed screw the split traveling nut unit 66, shown in detail in Fig. 12. The traveling nut unit 66 comprises two half-nut blocks 111 and 112 arranged for sliding movement toward and away from one another in a four-sided rectangular housing 113 secured within a saddle formed in the two L-shaped slides 61, as by welded joints formed between the slides and the bottom and side walls of the housing 113. The half-nut blocks 111 and 112 are provided with axially aligned internally threaded bores 114 and 115 above the feed screw meshing threads 116 and 117, one bore having left-handed threads and the other bore having right-hand threads. A unitary shaft 118 extends through the two bores 114 and 115 and is fixed in position by means of a retaining saddle 119 secured to the upper wall of the housing 113 and riding in an annular centrally arranged groove 120 on the shaft. The two portions of the shaft 118 within the half-nut blocks 111 and 112 are threaded to cooperate with the threads in the two bores 114 and 115. Turning one or both of the two handwheels 121 and 122 on the ends of the shaft 118 in one direction will cause the two half-nut blocks 111 and 112 to move away from one another and disengage their threads 116 and 117 from the feed screw 62; and turning one or both of the handwheels 121 and 122 in the opposite direction will bring the two half-nut blocks 111 and 112 back into engagement with the feed screw 62. With the traveling nut unit 66 disengaged from the feed screw 62, the carriage C may be moved by hand longitudinally in the tracks 60 over the carriage support, for properly adjusting the position of the blowpipe B with respect to the mineral mass to be pierced.

The provisions for independent adjustment of the blowpipe B and the carriage C relatively to one another, and for independent adjustment of the carriage C over the tracks 60 relatively to the feed screw 62 are particularly valuable because they permit a hole of very great depth to be pierced with blowpipe-driving apparatus considerably shorter than the depth of the hole to be pierced. For example, a blowpipe B of approximately twice the length of the feed screw 62 may be engaged by the chuck 106 approximately at its mid-point when the carriage C is drawn as far as possible toward the rear of the apparatus. After the carriage C has advanced for the full length of the feed screw 62, the chuck 106 may be disengaged from the blowpipe in the manner described above, and the split traveling nut unit 66 may be disengaged from the feed screw 62. The carriage C then is quickly returned by hand to its rearmost position, while the blowpipe B is held at its farthest point of advance. Thereafter the chuck 106 is again brought into engagement with the blowpipe B, the traveling nut unit 66 is again brought into engagement with the feed screw 62, and the carriage C carrying the blowpipe B again may be advanced continuously to increase the depth of the hole.

Disposal of the debris produced during the piercing of a hole, comprising disintegrated slag, the exhaust gases and fumes, and the steam and water discharged from the mouth of the hole, is accomplished by positioning the housing H of the debris-removal conduit D adjacent to the mouth of the hole being pierced, and applying a suction through a hose K connected to an exhaust fan E, in the manner shown in Fig. 8. As shown in Fig. 9, an annular water-spray ring 124 is fixed to the rim at the front of the housing H and arranged to discharge sprays of water rearwardly into the interior of the housing to insure the thorough moistening of the debris, as well as to keep clean the walls of the conduit D and expedite the passage of the debris. A water-spray nozzle 125 projects into an elbow 126 in the conduit D between the inclined neck 127 and the horizontal portion 128, to propel the particles of debris through the conduit and keep the walls clean. The spray ring 124 and the nozzle 125 are connected into a single water supply conduit 129.

The housing H includes a rearwardly projecting tubular member 130 forming a passage 131 axially aligned with the hollow shaft 96, through which the blowpipe B operates. The diameter of the passage 131 is sufficient to permit the projecting reamer teeth 31 on the forward end of the reamer sleeve 22 to pass easily. In order to prevent the escape of debris through the passage 131 to the atmosphere adjacent to the scene of operation, and in order to adequately support and guide the blowpipe B, a combined front bearing and closure 132 is provided, as shown in detail in Fig. 14. The bearing and closure 132 comprises two arcuate half-sections 133 and 134, hinged to the rear end of the tubular member 130 by means of bolts 135 and 136. Each of the half-sections 133 and 134, when in operative position, fits closely about the surface of the blowpipe B and is secured in position by means of a latch 137 comprising a bolt and pressure plate at the top of the tubular member 130. Preferably, the inner arcuate surfaces of the half-sections 133 and 134 are provided with a suitable wear-resistant material such as Haynes Stellite alloy, for resisting the abrasive action of the rotating reamer sleeve 22. In order to insert or remove the blowpipe B through the housing H, it is only necessary to loosen the latch 137, swing the two arcuate half-sections 133 and 134 apart, and pass the blowpipe through the passage 131.

The construction and arrangement of the debris-removal conduit D are described and claimed in Patent 2,327,497 granted to George H. Smith and Charles J. Burch, August 24, 1943.

Fig. 15 shows an electric arc apparatus for performing the method of the invention. The construction is very similar to the blowpipe of Fig. 1, except that the central tube 16 has been replaced by two electric cables 16′ connected at their forward ends to two tungsten electrodes 17′ projecting forwardly through the front of the tip 11′, and surrounded by electrical insulation 18′. The cables 16′ extend rearwardly to and through a rear body similar to that of Fig. 1, and may be connected to a suitable source of electricity. The arc formed between the electrodes 17′, is equivalent to an oxy-acetylene flame in the method of the invention.

As previously mentioned, minerals and mineral-like materials of many different kinds may be worked by the process and apparatus of the present invention. As an example, a hole 78 inches deep and 1⅝ inches in diameter was pierced at a slight angle upwardly from the horizontal by the method and apparatus of the invention in Minnesota Soudan iron ore, principally an extremely hard and dense iron oxide, at a rate of 3½ inches per minute, using a flux-forming powder mixture consisting of 50% aluminum and 50% ferro-manganese. In a total of 52 feet of drilling, using the same flux-forming mixture, the rate of drilling varied between 2 and 3½ inches per minute on different blasting holes.

In contrast, pneumatic drilling of Soudan iron ore, using regular drill steel bits proceeded at an average rate of less than ½ inch per minute, actual drilling time, over a total of 19,222 feet of drilling, according to the U. S. Bureau of Mines Information Circular 6911. According to the same circular, moreover, each bit averaged only 6 inches of drilling before resharpening was necessary.

From the foregoing, it is evident that there have been provided a novel and valuable method of and apparatus for thermally working mineral materials and the like, and particularly for thermally piercing holes in such materials. Although the invention has been described by way of example in connection with the piercing of holes, however, it is to be understood that the principles may be applied in other ways, and changes in construction of the apparatus and application of the method may be made by those skilled in the art, without departing from the spirit of the invention, as defined by the appended claims.

What is claimed is:

1. Method of working mineral materials and the like which comprises progressively melting material along a selected path and forming a fluid slag, quenching and solidifying the slag so formed, mechanically disintegrating the quenched slag, and removing the disintegrated slag from the region of disintegration.

2. Method of working mineral materials and the like which comprises progressively melting material along a selected path, introducing into the molten material a flux adapted to form therewith a slag which, when solidified, may be disintegrated easily, quenching and solidifying the slag so formed, mechanically disintegrating the quenched slag, and removing the disintegrated slag from the region of disintegration.

3. Method of piercing holes in mineral materials and the like which comprises progressively melting material at a selected zone and forming a fluid slag, advancing the melting zone into such material to form a hole, quenching and solidifying the fluid slag in such hole, mechanically disintegrating the quenched slag in such hole, and removing the disintegrated slag from such hole.

4. Method of piercing holes in mineral materials and the like which comprises progressively applying a flame to such material to melt the same and form a fluid slag, advancing the flame into such material to form a hole, injecting water into such hole in back of the region of the flame to quench and solidify the slag, mechanically disintegrating the quenched slag in such hole, and ejecting the disintegrated slag from such hole with a flowing stream of ejection fluid.

5. Method of piercing holes in mineral materials and the like which comprises progressively melting material at a selected zone and forming a fluid slag, advancing such melting zone into such material to form a hole, quenching and solidifying the fluid slag in such hole, mechanically disintegrating the quenched slag in such hole, reaming the walls of such hole, and removing the disintegrated slag from such hole.

6. Apparatus for thermally piercing holes in mineral materials and the like comprising heating means for producing intense localized heat adjacent an end thereof whereby to melt portions of such mineral material; cooling-fluid injecting means arranged around said heating means for injecting cooling fluid into such hole substantially uniform around said heating means to quench and solidify such melted portions; and disintegrating means behind said end, so constructed and arranged as to disintegrate such quenched portions by physical impact therewith uniformly around said heating means.

7. An elongated mineral piercing blowpipe having front and rear ends, said blowpipe having passage means provided with outlet means arranged for discharging combustible fluid through said front end to provide a flame; tooth means projecting laterally from said blowpipe behind but close to said front end, constructed and arranged for disintegrating mineral material loosened by said flame; said blowpipe having a passage for fluid coolant; and port means in front of at least part of said tooth means for discharging fluid coolant from said blowpipe.

8. A blowpipe for piercing holes in mineral materials and the like having a front end; a rear body; passage means for combustible fluid extending from said rear body to said front end; an external tube extending forwardly from said rear body to a position adjacent said front end, said tube being journaled on said rear body for rotation relatively thereto; and tooth means carried by said tube adjacent the front thereof for mechanically disintegrating slag or the like by physical impact therewith during rotation of said tube.

9. An elongated mineral piercing blowpipe having front and rear ends; a body at said rear end provided with inlets for combustible fluid and for fluid coolant; conduit means extending forwardly from said rear body provided with outlet means for discharging combustible fluid through said front end to provide flame; a sleeve arranged over said conduit means in spaced relation thereto, said sleeve being journaled at the rear end thereof for rotation relatively to said rear body, and being in communication with said coolant inlet; tooth means rotatable with said sleeve and projecting laterally therefrom adjacent to but just behind said front end; and port means in front of at least part of said tooth means in communication with the interior of said sleeve for discharging fluid coolant from said blowpipe behind said combustible fluid outlet means.

10. Apparatus for working mineral materials and the like comprising an elongated flame producing unit adapted to provide intense heat adjacent to the front thereof; a sleeve rotatably journaled on said unit; and means carried by said sleeve adjacent to the front thereof for disintegrating slag or the like by physical impact therewith.

11. A mineral piercing blowpipe comprising an elongated straight tubular member having front and rear ends, said tubular member being adapted to provide a flame adjacent to said front end; and tooth means projecting from said tubular member adjacent to said front end constructed and arranged for disintegrating mineral material loosened by such flame.

12. A blowpipe as claimed in claim 11 wherein said tooth means comprises a plurality of teeth extending substantially parallel to the longitudinal axis of said tubular member.

13. A blowpipe as claimed in claim 11, wherein said tooth means comprises a plurality of teeth inclined along the outer surface of said tubular member with respect to the projection of the longitudinal axis of said tubular member upon such outer surface.

14. A blowpipe as claimed in claim 11, wherein said tooth means comprises a plurality of teeth, each comprising a forward portion inclined along the outer surface of said tubular member with respect to the projection of the longitudinal axis of said tubular member upon such outer surface, and a rear portion extending substantially parallel to the longitudinal axis of said tubular member.

15. A blowpipe comprising a flame-producing unit including a tip, a body, and conduit means rigidly connecting said tip to said body; a rotatable sleeve arranged over said conduit means and journaled in said body for rotation relative to said flame-producing unit, said sleeve being supported at its front by said tip; and means carried by said sleeve adjacent to its forward end for disintegrating slag and the like by physical impact therewith.

16. A blowpipe comprising a flame-producing unit including a tip, a body, and conduit means rigidly connecting said tip to said body; a rotatable sleeve arranged over said conduit means in spaced relation thereto and journaled in said body for rotation relative to said flame-producing unit, said sleeve being supported at its front by said tip in substantially fluid-tight relation thereto; means urging said tip and said sleeve into substantially fluid-tight relation with each other; means carried by said sleeve adjacent to its forward end for disintegrating slag and the like by physical impact therewith; and said blowpipe having passage means adjacent to the forward end thereof communicating with the space between said sleeve and said conduit means and opening to the external surface of said blowpipe.

17. A blowpipe comprising a flame-producing unit including a tip, a body, and conduit means rigidly connecting said tip to said body; a rotatable sleeve arranged over said conduit means in spaced relation thereto and journaled in said body for rotation relative to said flame-producing unit, said sleeve being supported at its front by said tip; means carried by said sleeve adjacent to its forward end for disintegrating slag or the like by physical impact therewith; and a plurality of generally V-shaped passages in said tip, each passage comprising a leg inclined outwardly toward the rear of said blowpipe having a discharge opening on the outside of said tip, and a leg establishing communication between said first-named leg and the space between said sleeve and said conduit means.

18. A blowpipe having a flame-producing unit; a sleeve rotatably journaled on said unit; a plurality of generally longitudinally extending circumferentially spaced slag-disintegrating means carried by said sleeve adjacent to its forward end; passage means for discharging a cooling medium from said blowpipe ahead of said slag-disintegrating means; and said sleeve having passage means through the wall thereof between said slag-disintegrating means and intermediate the ends of the latter for discharging a cooling medium from said blowpipe.

19. Apparatus for piercing a mass of mineral material or the like comprising, in combination, an elongated heating device having front and rear ends, said heating device providing intense heat adjacent said front end; tooth means carried by said heating device and projecting therefrom adjacent said front end; advancing mechanism operable to advance said heating device and tooth means into such mass in a direction lengthwise of said device; and mechanism operable to rotate said tooth means during the operation of said advancing mechanism.

20. Apparatus for piercing a hole in a mass of mineral material or the like comprising, in combination, an elongated heating device having front and rear ends, said heating device being constructed to provide intense heat adjacent said front end; tooth means carried by said heating device and projecting therefrom adjacent said front end; said heating device having a passage for fluid coolant and port means arranged for discharging coolant therefrom to a region in front of at least part of said tooth means; advancing mechanism operable to advance said heating device and tooth means into such mass in a direction lengthwise of said device to form a hole; and mechanism operable to rotate said tooth means during the operation of said advancing mechanism.

21. Apparatus for piercing holes in a mass of mineral material or the like comprising, in combination an elongated flame-producing unit adapted to heat and melt portions of such material; means for discharging a fluid adjacent to the forward end of said unit to quench and solidify such melted material; a device rotatably journaled on said unit; means carried by said device adjacent to the forward end thereof for disintegrating such solidified material by physical impact therewith; means for advancing both said unit and said device into such mass to form a hole; and means for rotating said device.

22. Apparatus for piercing a hole in a mass of mineral material or the like comprising, in combination, an elongated flame-producing unit; a device rotatably mounted on said unit; tooth means carried by said device and projecting therefrom adjacent to the forward end thereof; means for advancing said unit and said device and the tooth means carried by the latter into such mass to form a hole; and means for rotating said device during the operation of such advancing means.

23. Apparatus for producing holes in mineral materials and the like, having an elongated flame-producing unit adapted to provide an intense heating flame adjacent to one end thereof; a sleeve rotatably journaled on said unit; passage means for discharging water from said apparatus adjacent to said end of said flame-producing unit to quench and solidify molten slag; and means carried by said sleeve adjacent to said passage means for disintegrating quenched slag by physical impact therewith.

24. A blowpipe comprising a flame-producing unit including a tip, a body, and conduit means rigidly connecting said tip to said body; a rotatable sleeve arranged over said conduit means and journaled in said body for rotation relatively to said flame-producing unit, said sleeve being supported at its front by said tip; spring means carried by said body resiliently urging said sleeve against said tip; and means carried by said sleeve adjacent to the front thereof for disintegrating slag and the like by physical impact therewith.

CHARLES J. BURCH.